United States Patent [19]

Holtmyer et al.

[11] Patent Number: 5,062,969

[45] Date of Patent: Nov. 5, 1991

[54] CROSSLINKABLE INTERPOLYMERS

[75] Inventors: Marlin D. Holtmyer; Charles V. Hunt; Weldon M. Harms, all of Duncan, Okla.

[73] Assignee: Halliburton Company, Duncan, Okla.

[21] Appl. No.: 355,597

[22] Filed: May 22, 1989

[51] Int. Cl.$^5$ ............................................. E21B 33/00
[52] U.S. Cl. .............................. 252/8.551; 526/273; 526/287; 526/304
[58] Field of Search .................... 252/8.551; 526/273, 526/287, 304

[56] References Cited

U.S. PATENT DOCUMENTS

| | | | |
|---|---|---|---|
| 3,779,970 | 12/1973 | Evani | 260/29.6 RW |
| 3,794,608 | 2/1974 | Evani | 260/29.6 RW |
| 4,079,028 | 3/1978 | Emmons | 260/29.7 NR |
| 4,209,605 | 1/1980 | Hoy | 528/54 |
| 4,228,277 | 10/1980 | Landoll | 536/90 |
| 4,243,802 | 1/1981 | Landoll | 536/91 |
| 4,432,881 | 2/1984 | Evani | 252/8.5 C |
| 4,463,152 | 7/1984 | Schultz | 526/309.7 |
| 4,520,182 | 5/1985 | Turner | 526/307.2 |
| 4,524,175 | 6/1985 | Stanley, Jr. | 524/831 |
| 4,528,348 | 7/1985 | Turner | 526/225 |
| 4,541,935 | 9/1985 | Constien | 252/8.55 R |
| 4,673,716 | 6/1987 | Siano | 525/367 |
| 4,694,046 | 9/1987 | Bock | 525/329.4 |
| 4,728,696 | 3/1988 | Van Phung | 526/304 |
| 4,730,081 | 3/1988 | Holtmyer | 560/222 |
| 4,767,550 | 8/1988 | Hanlon | 252/8.551 |
| 4,780,517 | 10/1988 | Ching | 526/240 |

Primary Examiner—Joseph L. Schofer
Assistant Examiner—Alex H. Walker
Attorney, Agent, or Firm—Robert A. Kent

[57] ABSTRACT

The present invention relates to novel crosslinkable interpolymers and methods of use in treating subterranean formations. The novel interpolymers comprise a water soluble monomer, a hydrophobe monomer, and vicinal diol monomer polymerized to form high molecular weight polymers which viscosify aqueous liquids. The solution viscosity may be enhanced by the addition of a surfactant having an HLB value of about 10 or less. The interpolymers are readily crosslinkable with polyvalent metal ions, such as titanium and zirconium to form thermally stable viscoelastic gels. The gels provide viscosity and solids transport characteristics that are useful in stimulating, gravel packing and polymer flooding operations.

18 Claims, No Drawings

CROSSLINKABLE INTERPOLYMERS

BACKGROUND OF THE INVENTION

This invention relates to the treatment of subterranean formations surrounding oil wells, gas wells, water wells, injection wells and similar bore holes The flow of fluids from a subterranean formation to a well bore depends, among other factors, upon the permeability and flow capacity of the formation. Often permeability or flow capacity is not sufficient to allow a desired flow rate of fluids, such as crude oil or natural gas, from the formation. In such a case the formation can be treated to increase its production. These treatments include stimulating, gravel packing and polymer flooding.

Hydraulic fracturing is one type of stimulation treatment used to increase the production of fluids Accordingly many methods have been developed which are useful for hydraulically fracturing a subterranean formation penetrated by a well bore. Commonly, in the art of hydraulic fracturing, a fluid is introduced into the formation sought to be fractured by a conduit, such as tubing or casing, disposed in a well bore. The fluid is introduced at a rate and pressure sufficient to produce a fracture in the formation and to extend the produced fracture from the well bore into the formation. The fluid can include a propping agent, for example sand, which results in placement of the propping agent within the fracture thus produced. Following the fracturing treatment, the introduced fluid is recovered from the formation but the proppant remains in the produced fracture to prevent complete closure of the formation. Thus, a highly conductive channel extending from the well bore into the formation is created through which formation fluids can easily flow.

Conventional fracturing fluids typically contain natural or synthetic water soluble polymers, which are well known in the art. Water soluble polymers viscosify aqueous liquids (used hereafter to mean any liquid containing some water) at relatively low concentrations due to their high molecular weight. However, very high molecular weight synthetic polymers are difficult to manufacture and tend to degrade when exposed to the high shear conditions encountered in petroleum recovery operations.

Gravel packing is another type of treatment used to increase the production of fluid from a formation. Unconsolidated formations, particularly those containing loose sands and soft sandstone strata, present constant problems in well production due to migration of loose sands and degraded sandstone into the well bore as the formation deteriorates under the pressure and flow of fluids therethrough. This migration of particles may eventually clog the flow passages in the production system of the well, and can seriously erode the equipment. In some instances, the clogging of the production system may lead to a complete cessation of flow or "killing" of the well.

One method of controlling sand migration into a well bore consists of placing a pack of gravel on the exterior of a perforated or slotted liner or screen which is positioned across an unconsolidated formation to present a barrier to the migrating sand from the formation while still permitting fluid flow. The gravel is carried to the formation in the form of a slurry, the carrier fluid being removed and returned to the surface. The proper size of gravel must be employed to effectively halt sand migration through the pack, the apertures of the liner or screen being gauged so that the gravel will settle out on its exterior, with the slurry fluid carrying the gravel entering the liner or screen from its exterior.

While numerous methods are available for effecting gravel packs in substantially vertical well bores, such methods often are unsatisfactory in effecting gravel packing of highly deviated well bores. Conventional gravel packing fluids utilizing uncrosslinked hydroxyethylcellulose, hydroxypropylguar, xanthan gum and the like as the viscosifier allows or permit the gravel to fall or settle to the low side of the tubing in long highly deviated wells. Such settling can result in a premature "sand-out" caused by a bridging of the settled particles across the tubing.

An ideal fluid for gravel packing operations would be one that shows little or no settling of gravel so that a high concentration of gravel can be transported through the tubing at any angle. The fluid also should exhibit adequate fluid loss to insure compact packing of the gravel against the formation face. The fluid also should "break" to a reduced viscosity fluid similar to the viscosity of water over a predesigned time interval and deposit no residual solids so as to avoid or minimize any formation damage.

A third type of treatment to increase the production of fluids from a formation is a flooding operation. Enhanced oil recovery (EOR) by flooding has become widely practiced by the petroleum industry. In conventional enhanced oil recovery processes, an aqueous flooding liquid is injected into the subterranean formation through a pattern of injection wells which surround one or more producing wells. The flooding liquid acts as an oil-immiscible front which displaces oil from the formation and forces it to the production well. In order to maximize the displacement efficiency of the flooding liquid, it has been a practice to add various materials to the medium to increase its viscosity.

As taught in "Encyclopedia of Polymer Science and Technology", Interscience Publishers, Vol. I, 192 (1964) it is known that the viscosity of an aqueous medium is increased by the addition of a water-soluble polymer. Such water-soluble polymers include polyacrylamide, acrylamide/acrylic acid copolymer, sodium polyacrylate, carboxymethyl cellulose, hydroxyethyl cellulose, methyl cellulose, polysaccharide as well as naturally occurring polymers such as guar and chemically modified guar such as hydroxypropyl guar.

Unfortunately, however, the aforementioned conventional water-soluble polymers suffer from many serious deficiencies or limitations in actual use in enhanced oil recovery. For example, for reasons of efficiency and economical considerations, it is common to employ very high molecular weight versions of such polymers. However, during the injection stage of the EOR process (i.e., the pumping of the liquid into the formation), the aqueous medium containing the high molecular weight water-soluble polymer is exposed to high shear. Such shear often causes mechanical degradation of the polymer and thus reduces the viscosity of the aqueous medium. While lower molecular weight polymers are less sensitive to shear degradation, they must be used in much higher concentrations in order to achieve the desired level of viscosity.

In attempts to overcome some of the aforementioned deficiencies of the conventional water-soluble polymers, it has been a common practice to crosslink the polymer in order to improve resistance to thermal and shear degradation. See for example, U.S. Pat No. 3,247,171. Such attempts have generally not been successful. More recently, as taught in U.S. Patent No. 3,984,333, an aqueous medium has been thickened by dissolving a water-soluble block copolymer having water-soluble blocks and water-insoluble blocks in the aqueous medium. While such water-soluble block copolymers apparently exhibit reasonably good resistance to shear degradation, such polymers are difficult and often impractical to prepare. More importantly, such polymers do not exhibit significant tolerance of electrolytes normally present in the aqueous media to be thickened.

New synthetic polymers, known as interpolymers, are provided by the present invention and overcome the deficiencies of polymers currently used in stimulating, gravel packing, and flooding of subterranean formations. The interpolymers achieve the effect of high molecular weight polymers in solution with improved shear degradation properties, and generally, interpolymers are synthetic polymers that incorporate small amounts of hydrophobic groups into a polymer chain which is composed of water soluble monomers. The hydrophobic groups tend to associate with one another in the aqueous liquid, or associate with the hydrophobic portion of a surfactant present in the aqueous liquid. When hydrophobe association occurs, the solution viscosity increases relative to the same polymer without hydrophobic side groups. An additional benefit of some hydrophobe associative polymers is that the viscosity of the polymer is relatively insensitive to salts in the aqueous liquid due to the non-ionic character of the hydrophobic groups.

The synthesis of polymers and copolymers incorporating hydrophobic side groups is described in the art. Copolymers of acrylamide with water-insoluble alkylacrylamide and salts of acrylic acid and processes of making the polymers are disclosed in U.S. Pat. Nos. 4,520,182, 4,694,046, 4,673,716, and 4,528,348. Copolymers of acrylamide and alkylpoly(etheroxy)acrylate are disclosed in U.S. Pat. No. 4,463,152. Copolymers of acrylamide and a hydrophobe monomer to viscosify aqueous liquids are. disclosed in U.S. Pat. Nos. 4,524,175, 4,541,935, and 4,432,881. Additional hydrophobe associative copolymers are disclosed in U.S. Pat. No. 4,728,696.

Each of these patents disclose the utility of hydrophobe associative polymers in petroleum recovery operations because the polymers retain viscosity in aqueous solution when subjected to either shear, heat, or high salt concentrations or combinations thereof. Although hydrophobe-containing polymers with and without surfactants are an improvement over polymers without hydrophobes, the polymer systems do not provide sufficient proppant transport and viscosity characteristics for many well bore treatments. These characteristics are best obtained by chemically crosslinking polymers in aqueous solution to create relatively shear-stable and temperature-stable viscoelastic gels. The term "gel" is used hereafter to mean any crosslinked polymer solution.

The present invention combines the advantages of hydrophobe-containing polymers with the desirable characteristics of chemically crosslinked polymers to provide highly stable gels useful in treating subterranean formations. The novel crosslinkable interpolymers of the present invention overcome many of the deficiencies of previous hydrophobe-containing polymers by incorporating a vicinal diol-containing monomer, which is crosslinkable with a variety of polyvalent metal ions. The interpolymers (alone and in combination with hydrophobe-containing surfactants) provide viscosity at low shear rates that is significantly higher than polymers without hydrophobic groups. Additionally, the crosslinked interpolymers provide temperature stable gels with enhanced proppant transport qualities.

DETAILED DESCRIPTION

The novel interpolymers of the present invention provide a new method for treating a subterranean formation. The novel interpolymers provide the advantages of both hydrophobe-containing polymers and readily crosslinkable polymers that form stable viscoelastic gels. These gels have enhanced solids transport characteristics and viscosity stability at elevated temperatures.

The novel interpolymers are represented by the formula:

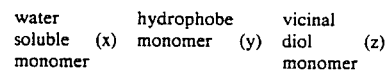

where x, y, and z are mole percentages of the reactants. Actual polymer composition depends upon the reactivity of the respective monomers as well as the initial concentrations of the monomers. Substantially water soluble vinyl monomers suitable for the present invention include, but are not limited to, acrylamide, partially hydrolyzed acrylamide, N-substituted acrylamides, acrylic acid, methacrylic acid, and mixtures thereof. As set forth in U.S. Pat. No. 4,767,550, N,N-dimethylacrylamide may be utilized in place of acrylamide to enhance temperature stability of a polymer composition. The preferred water soluble vinyl monomer is acrylamide. The water soluble monomer is preferred in an amount of about 94 mole percent to about 99 mole percent. Most preferably, the water soluble monomer is present in an amount of about 97 to about 99 mole percent.

Hydrophobe monomers suitable for the present invention include alkyl methacrylates, alkyl acrylates, N-alkyl acrylamides, and N-alkyl methacrylamides with the alkyl group having 6 to 18 carbon atoms and mixtures thereof. The preferred hydrophobe monomer is an alkyl methacrylate. The hydrophobe monomer is preferred in an amount of at least about 0.5 to about 5 mole percent. The most preferred range of hydrophobe monomer is about 0.5 to about 3 mole percent.

The vicinal diol monomer provides the chemical functional group that renders the interpolymers of the present invention readily crosslinkable with polyvalent metal ions. Examples of these monomers include glyceryl allyl ether, glycidyl methacrylate, allyl glycidyl ether and methacrylamidopropyldimethyl-2,3-dihydroxypropyl ammonium sulfate (MAPDMDHPAS). The preferred vicinal diol monomer is MAPDMDHPAS, described in U.S. Pat. Nos. 4,730,081 and 4,767,550, which are herein incorporated by reference. The vicinal diol monomer is preferred in an amount of about 0.5 to about 1 mole percent.

The novel interpolymers of the present invention may be prepared using inverse emulsion polymerization techniques. In general, the desired mole percentage of hydrophobe monomer is dispersed in the oil phase together with emulsifying surfactants. The desired mole percentages of water soluble monomer and vicinal diol monomer are prepared in an aqueous medium. The aqueous medium is slowly added to the oil phase with sufficient agitation to form an emulsion. It is believed that physical contact of the monomers at the oil-water interface is necessary in order for the polymer to be formed. An initiator is also added to the emulsion to facilitate polymerization. The polymerization reaction is generally considered complete one hour after the exothermic temperature rise of the emulsion dissipates to the temperature before exotherm Suitable emulsifying surfactants for use in the present invention include oil soluble surfactants, such as fatty diethanolamides, sorbitan fatty acid esters, ethoxylated sorbitan fatty acid esters such as sorbitan monooleate and sorbitan sesqioleate and mixtures thereof. Suitable polymerization initiators include the inorganic persulfates (potassium persulfate, sodium persulfate, ammonium persulfate), azo catalysts such as azobisisobutyronitrile, and organic peroxygen compounds (benzylperoxide, t-butyl hydroperoxide, etc.). The preferred initiators are azo catalysts and in particular, 2,2'-azobis(2,4-dimethylvaleronitrile) Vazo ® 52. Vazo is a registered trademark of E.I. DuPont De Nemours & Co., Inc.

After polymerization of the monomers, the interpolymer of the present invention is in the form of a relatively stable invert emulsion. The interpolymer is solubilized in aqueous liquids upon inversion of the emulsion, which is accomplished by adding a surfactant. Generally, any inverting surfactant or inverting surfactant mixture described in the prior art may be used. Preferred inverting surfactants are non-ionic surfactants, such as ethoxylated nonylphenols containing about 6 to 20 moles of ethylene oxide, or alkyl polyethyleneoxyalcohols.

Interpolymers formed in accordance with the present invention invert in aqueous liquids to form viscous polymer solutions. The rate of inversion is controlled by the mixing conditions and the concentration of inverting surfactant. Aqueous liquids used in treating subterranean formations normally contain chloride salts, such as sodium chloride or potassium chloride. Chloride salts may affect the viscosity of the polymer in solution due to ionic repulsion. A desired viscosity in aqueous liquids is generally obtained by adjusting the interpolymer concentration. The preferred polymer concentration of this invention is in the range of about 0.2 percent by weight to about 2.0 percent by weight of aqueous liquid. The most preferred polymer concentration is in the range of about 0.5 to 0.8 percent by weight of aqueous liquid.

General relationships between polymer concentration, molecular weight and solution viscosity have been established and described in texts such as *Dynamics of Polymeric Liquids*, Vol. I, by Byrd, Armstrong and Hassager. First, as polymer molecular weight increases, a constant polymer concentration provides increased viscosity in solution. Second, as polymer concentration increases, solution viscosity increases. Each of these relationships is derived from the theory that viscosity, or resistance to flow, is the result of polymer chain interactions or entanglements which are both inter- and intra-chain. Longer polymer chains in a fixed volume of solvent create more entanglements, and thus increase viscosity. Greater numbers of polymer chains in a fixed volume of solvent create more entanglements, and thus more viscosity.

Hydrophobe-containing polymers of the present invention are believed to increase the viscosity of aqueous solutions by analogy. The hydrophobic groups of the polymer are believed to interact via micellular bridging to increase the number of polymer entanglements and thus solution viscosity. The solutions exhibit "shear thinning" behavior because the entanglements break under high shear. The entanglements reform when the shear level is decreased. Solution viscosity may be affected if the number of hydrophobic groups is such that 1) the water soluble portion of the polymer is unable to fully solubilize or 2) complete inversion of the polymer is inhibited.

Solution viscosity may be further enhanced by the addition of a hydrophobe-containing surfactant after hydration of the interpolymer. The hydrophobic groups of the surfactant are believed to associate with hydrophobic groups of the polymer, thereby further increasing the number of entanglements in solution. This post-added surfactant is particularly advantageous in that it increases solution viscosity at low shear rates. Effective three dimensional entanglements, reflected as high viscosity at low shear rates, is believed to enhance the ability of a treatment fluid to transport solids. The entanglements also provide a fluid that resists movement in a static condition, which is believed to be beneficial to provide conformance control in enhanced oil recovery operations.

Suitable post-added surfactants for use in the present invention are those generally having a hydrophilic-lipophilic balance (HLB) of about 10 or less. Preferably the HLB is in the range of about 4 to 9. The selection of a particular post-add surfactant is dependent upon the composition and concentration of the inverting surfactant in the polymer solution. Examples of suitable surfactants are ethoxylated linear alcohols, ethoxylated tridecyl alcohols, ethoxylated phenols such as nonylphenols and dodecylphenols, hydroxyethyl fatty amines, fatty dialkanol amides, and mixtures thereof with an HLB of generally about 10 or less. The preferred post-added surfactants are hydroxyethyl fatty amines and admixtures containing such amines. The preferred surfactant or surfactant solution is added at about 0.01 to 1.0 percent by volume of aqueous liquid. The composition and concentration of the hydrophobe-containing surfactant affects the sand support characteristics of the polymer solutions and gels. The most preferred concentration of post-added surfactant is in the range of about 0.2 to 0.6 percent by volume.

Although the viscosity of the treating fluid of the present invention is increased through hydrophobe associations, the magnitude and stability of viscosity is maximized by the addition of a crosslinking agent to form a viscoelastic gel. Crosslinking agents are typically polyvalent metal ions which are capable of forming a bond between vicinal diol groups on the polymer. These crosslinking agents may be rapid in forming a crosslink bond or may be retarded in their action as commonly known by those skilled-in-the-art and described in U.S. Pat. No. 4,477,360, 4,464,270, and 4,502,967. After the crosslinking reaction occurs, a viscoelastic, temperature-stable gel is formed. The crosslinking agent is preferably added in an amount to provide a metal ion concentration in the range of about 0.002 percent by weight to 0.02 percent by weight of polymer solution. The most preferred metal ion concentration is in the range of about 0.004 to about 0.02 percent by weight.

Crosslinking agents utilized in the present invention can generally be described as water soluble salts and complexes of multivalent metal ions. Examples of multivalent metal ions are zirconium, antimony, titanium, chromium, hafnium, niobium, cerium, iron, and aluminium. In addition to the metal cations, boron and the like can be utilized as a crosslinking agent. Preferred crosslinking agents of the present invention are titanium (IV) and zirconium (IV) salts which are provided in an amount sufficient to provide a metal ion concentration in the range of about 0.004 to 0.02 percent by weight. Examples of titanium (IV) and zirconium (IV) salts are triethanolamine titanate, titanium acetylacetonate, zirconium acetylacetonate, zirconium lactate, triethanolamine zirconate, and titanium or zirconium complexes including polyols and water to retard the reaction rate of the crosslinking agent.

Gels formed from these novel interpolymers have better crosslinkability, higher viscosity at elevated temperatures and better proppant transporting properties than gels prepared from polymers without hydrophobic groups. The hydrophobe interactions significantly increase the three dimensional network of the gel under low shear conditions. As a result, the log relation of shear stress and shear rate is non-linear over the shear rate range normally encountered during petroleum recovery operations. Rheological characterization of the gels using the standard power law model appears to be adequate for only high shear conditions, i.e, greater than about 100 $s^{-1}$.

Solutions and gels of these interpolymers are especially useful for treating subterranean formations due to their solids (e.g. proppant) transport characteristics and viscosity stability.

Stimulation

In stimulating a subterranean formation, a solution of interpolymer is prepared according to the methods described herein. The polymer solution is admixed with a crosslinking agent, and a propping agent if desired. The propping agent is normally sand, resin-coated sand, or bauxite of various mesh sizes. Selection of the proppant depends upon the particular formation conditions.

The crosslinking agent and propping agent are added to the polymer solution as it is pumped to the well bore. The polymer solution is pumped into the well bore at a flow rate and pressure sufficient to create at least one fracture in the subterranean formation. The fluid carries the propping-agent to the fracture and experiences extremely high shear rates (greater than 1,000 s ) as it travels through the surface tubular goods, the well bore, and the perforations. Once the fluid is in the fracture, the shear rate decreases. However, the shear rate is always a function of the injection rate of the fluid, and the diameter of the tubular goods and the fracture. Often times the fracture shear rate decreases to a level of less than 100 $s^{-1}$ and perhaps on the order of 40 to 50 $s^{-1}$. At these conditions, conventional polysaccharide gels have proppant carrying capacity; however, that capacity may be diminished due to shear or temperature degradation of the gel. Gels formed from interpolymers have an exceptional ability to carry proppant under fracture shear rate conditions due to the hydrophobe associations. Ideally, the function of the gel is to carry proppant the length of the created fracture so that the entire fracture will be "propped" open upon closure of the formation.

General Packing

The gravel pack of the present invention may be formed in a variety of ways and is particularly useful for gravel packing highly deviated well bores. Generally, a minor amount of the formation adjacent that section of the well to be treated is removed by washing with hot water as in the case of a tar sand formation or other suitable fluid or by underreaming to form a small cavity in the immediate vicinity of the well bore. After a suitable amount of material has been removed, the tubing string or other well hardware is placed in the well following which the particulate material is introduced into the well bore opposite the permeable formation.

In one method of introducing the particulate into the well, a crosslinked interpolymer slurry containing the particulate agent is formed and pumped into the well bore. Generally, the interpolymer slurry is pumped down the annulus between the well tubing and the well casing, through the bottom of the annulus and then through perforations (such as slots or other openings) in the closed-end tubing which extends below the casing to a location opposite the permeable zone. The perforations in the tubing are selected so that the particulate material is filtered from the slurry as it enters the tubing. The carrier liquid is removed to the surface through the tubing by pumping. Simultaneously, the slurry is forced into the formation and the particulate material contained is filtered out against the formation face. The remaining gravel packing fluid in the well bore, upon placement of the desired quantity of gravel, is permitted to break to a low viscosity fluid. The particulate agent remaining suspended in the fluid now separates and settles to form a pack having a minimum of void spaces. Normally, once the gravel packing fluid has broken, pumping of the fluid is resumed in the well bore to further compact or settle the gravel pack or to further minimize void spaces that may be present. The granular or particulate materials thus removed from the slurry form a pack consisting essentially of particulate which is tightly packed together to form a permeable sand control pack.

In another method of gravel packing, the casing which extends through the permeable production zone is perforated near the top and again near the bottom of the producing zone after which a tubing string is equipped with a back-off connection so that the tubing can be pulled after packing. A screen or perforated liner attached to the tube at the end is run and the screen or liner is positioned opposite the lower set of perforations. Then a packer is set between the two sets of perforations. Gravel packing fluid containing the interpolymer and particulate agent is pumped down the annulus between the casing and the tubing out of the upper set of perforations, through the previously formed cavity outside the casing opposite the perforations then back through the lower set of perforations and finally through the screen. The particulate agent is filtered out against the lower set of perforations and against the formation face from the portion of the slurry which is simultaneously forced into the formation.

Polymer Flooding

In conventional EOR processes, an aqueous flooding liquid is injected into the subterranean formation through a pattern of injection wells which surround one or more producing wells. The flooding liquid acts as an oil-immiscible front which displaces oil from the formation and forces it to the production well. In order to maximize the displacement efficiency of the flooding liquid, the viscosity of the flooding medium is increased by the addition of interpolymers of the present invention.

The flooding medium is typically an aqueous liquid that contains electrolytes. An interpolymer of the present invention is prepared in the aqueous liquid and subsequently pumped into an injection well at sufficient rates and pressures.

The interpolymers described herein are well suited for EOR processes because of their thermal and shear stability.

The following examples are provided to further demonstrate the advantageous properties of the interpolymers of the present invention. The examples are not intended to limit the invention in any way.

EXAMPLE 1

Crosslinkability of the interpolymers of the present invention is demonstrated in the following experiments. Interpolymers with various mole percentages of the diol monomer were prepared in accordance with inverse emulsion polymerization technique described herein. Polymer solutions of the prepared emulsions were made in a 1 liter Waring ® Blendor containing 750 ml of water with potassium chloride at 2% by weight and 0.25 percent by weight inverter comprising an admixture containing an ethoxylated nonylphenol. Emulsion was added to the KCl solution at a concentration to provide 0.72% by weight interpolymer with the blender stirring at a moderate speed. The polymer solution was stirred for at least 1 hour before testing. A titanium crosslinking agent was admixed with 100 ml of polymer solution in the blender resulting in 2 gallons of crosslinking agent per 1,000 gallons of aqueous liquid (gpt). The concentration of metal ion in the gel was 0.005 percent by weight. The mixture was transferred to a jar and then stored in a constant temperature bath at 180° F. Samples were evaluated at 1, 3, 4, 6, and 24 hours for gel formation.

TABLE 1

| | Mole Percent | | | |
|---|---|---|---|---|
| Polymer Number | Water Soluble[1] Monomer | Hydrophobe[2] Monomer | Diol[3] Monomer | Crosslink formed with Titanium (IV) at 180° F. |
| 1 | 99 | 0.5 | 0.5 | Slight |
| 2 | 98 | 1.0 | 1.0 | Yes |
| 3 | 94 | 5.0 | 1.0 | Yes |
| 4 | 99.5 | 0.5 | 0.0 | No |
| 5 | 99.5 | 0.0 | 0.5 | Slight |
| 6 | 97 | 2.0 | 1.0 | Yes |
| 7 | 99 | 0.0 | 1.0 | Yes |

Polymer concentration: 0.72 wt % polymer
Surfactant: Oleyl diethanolamide - 5 gpt
Crosslinker Concentration: 2 gpt Triethanolamine Titanate
[1] Acrylamide
[2] Lauryl Methacrylate
[3] MAPDMDHPAS The results in Table I demonstrate that the presence and concentration of diol monomer substantially affects crosslinkability of the interpolymer. No gel formation was observed for Polymer No. 4 which contained 0 mole percent diol monomer. As the mole percent of diol monomer increases, stronger gels are formed.

EXAMPLE 2

The interpolymers of the present invention readily crosslink with zirconium (IV) ions. Solutions of polymers were prepared as described in Example 1. A zirconium crosslinking agent was admixed with 100 mls of polymer solution in the blender to provide a metal ion concentration of 0.005 percent by weight in the gel. The mixture was transferred to a jar and then stored in a constant temperature bath at 180° F.

TABLE 2

| Polymer Number | Polymer[1] Monomer Feed Composition (Mole % of Reactants) | | | Crosslink formed with Zirconium (IV) at 180° F. After 1 Hr. |
|---|---|---|---|---|
| | Water Soluble[2] Monomer | Hydrophobe[3] Monomer | Diol[4] Monomer | |
| 8 | 98 | 1 | 1 | Slight |
| 9 | 97 | 2 | 1 | Yes |
| 10 | 99 | 1 | 0 | No |
| 6 | 97 | 2 | 1 | Yes |
| 7 | 99 | 0 | 1 | Slight |
| 11 | 100 | 0 | 0 | No |
| 12 | 95 | 2 | 3 | Yes |

Polymer concentration: 0.48 wt %
Post Added Surfactant: 3 gpt bis-2-(hydroxyethyl)cocoamine
Crosslinker Concentration: 1 gpt zirconium lactate.
[1] Polymers 8, 9, 10 prepared from emulsions using sorbitan monooleate/5 mole E.O. sorbitan monooleate as the emulsifier. Polymers 6, 7, 11, 12 prepared from emulsions using sorbitan monooleate/oleyl diethanolamide as the emulsifier.
[2] Acrylamide
[3] Lauryl Methacrylate
[4] MAPDMDHPAS The data in Table 2 also show that no crosslink is formed unless the vicinal diol monomer is present. Based on visual observation, the extent of crosslinking is increased if the mole percentages of vicinal diol monomer and the hydrophobe monomer are increased.

EXAMPLE 3

To demonstrate the enhanced viscosity of the interpolymers of the present invention at low shear rates, the following experiments were performed. Solutions of polymers No. 6 and No. 7 were prepared as described in Example 1. Various post-added surfactants were mixed with the polymer in solution to affect the hydrophobe moiety on the polymer. Viscosity of the polymer solutions were measured using a Brookfield Viscometer, RVT Model, Spindle No. 4. The viscosity measurements are reported in Table 3.

TABLE 3

| | Brookfield Viscosity (CPS) | | | | | |
|---|---|---|---|---|---|---|
| | Polymer No. 6 2% Hydrophobe Viscosity, cp at RMP | | | Polymer No. 7 0% Hydrophobe Viscosity, cp at RPM | | |
| Surfactant | 2.5 | 5 | 10 | 2.5 | 5 | 10 |
| No Surfactant | 360 | 310 | 285 | 800 | 670 | 550 |
| Tridecyl Alcohol: 2 mole E.O. | 2360 | 1880 | 1520 | 1360 | 1080 | 950 |
| C12–C15 Alcohol: 3 mole E.O. | 3740 | 3000 | 2200 | 1720 | 1550 | 1275 |
| Bis(2-Hydroxyethyl) cocoamine | 1860 | 1500 | 1265 | 1120 | 980 | 770 |
| Bis(2-Hydroxyethyl) oleylamine | 4160 | 2850 | 2300 | 1200 | 1000 | 800 |

The data in Table 3 show that (1) the hydrophobe-containing polymer without a post-added surfactant has significantly less viscosity than the non-hydrophobe-containing polymer (2) post-added surfactants increase the viscosity of the hydrophobe-containing polymer by at least a factor of 5 and (3) the magnitude of the viscosity increase is dependent upon the particular post-added surfactant.

EXAMPLE 4

The improved proppant transport characteristics of crosslinked interpolymers are demonstrated in this example. Solutions of polymers No. 2 through 7 were prepared as described in Example 1. Oleyl diethanolamide (0.5 ml) was added to the polymer solutions (100 ml) and the polymers were crosslinked with a crosslinking agent that provided titanium ions at a concentration of 0.005 weight percent. These samples were placed in a water bath at 180° F. and crosslink formation was observed. After 24 hours, 12 g of resin-coated sand (20–40 mesh), was dispersed homogeneously in the sample by vigorous shaking for about two minutes. Samples were returned to the water bath and observed at regular time intervals to determine when the majority of sand particles had settled to the bottom of the glass jar. The data in Table 4 show the most rapid settling occurred with polymer that did not contain either hydrophobe side groups or the diol monomer.

A rapid settling rate was also observed when the post-added surfactant was omitted from the solution. A substantial increase in proppant support was obtained when the polymer was prepared with 2 mole percent hydrophobe and diol monomer present plus a post-added surfactant.

TABLE 4

Sand Settling Tests at 180° F.

| Polymer Number | Hydrophobe Mole % | Diol Mole % | Sand Settling Time (Minutes) |
|---|---|---|---|
| 2 | 1.0 | 1.0 | 6.0 |
| 3 | 5.0 | 1.0 | 8.0 |
| 4 | 0.5 | 0.0 | 1.5 |
| 5 | 0.0 | 0.5 | 3.5 |
| 6 | 2.0 | 1.0 | 26.0 |
| 6* | 2.0 | 1.0 | 4.0 |
| 7 | 0.0 | 1.0 | 1.75 |
| 7* | 0.0 | 1.0 | 1.0 |

Polymer Concentration: 0.72 weight %
Aqueous Liquid: 2% KCl
Post Added Surfactant: Oleyl diethanolamide
Sand Concentration: 12 g/100 ml (1 lb/gallon)
*No post-added surfactant

EXAMPLE 5

Solutions of polymers No. 4, 6, and 7 were prepared as described in Example 1. The solutions were admixed with a zirconium crosslinking agent, which provided 0.01% wt. zirconium (IV) ions. Solutions were evaluated on a FANN ® Model 50 viscometer using a modified bob that provides a shear rate range of 20 s$^{-1}$ to 180 s$^{-1}$. The temperature bath of the viscometer was preheated to 250° F. Shear stress measurements were taken at various shear rates at 15 minute time intervals. The recorded stress versus rate data were used to calculate the power-law viscosity model parameters n' and K'. These parameters then were used to calculate apparent viscosity at the shear rate of 170 reciprocal seconds (s$^{-1}$).

TABLE 5

Rheological Properties of Polymers at 250° F.

| Polymer Number | Apparent Viscosity (cps at 170 s$^{-1}$) after 120 minutes |
|---|---|
| 4 | <50 |
| 6 | 135 |
| 6* | 110 |
| 7 | 110 |
| 7* | 75 |

*No post-added surfactant

The data in Table 5 demonstrate that crosslinked interpolymers formed in accordance with the present invention provide temperature-stable gels for treating subterranean formations. The gels maintain sufficient viscosity to treat subterranean formations which ordinarily require the fluid to remain substantially viscous for at least 2 hours at 250° F.

We claim:

1. A method for treating a subterranean formation comprising:

providing an interpolymer that is the polymerization product of a mixture represented by the formula:

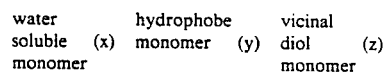

| water soluble monomer | (x) | hydrophobe monomer | (y) | vicinal diol monomer | (z) | where the mole percent of each monomer is represented by x, y, and z and said hydrophobe monomer is selected from the group comprising alkyl methacrylate, acrylate esters, N-alkyl acrylamide, and N-alkyl methacrylamides with the alkyl group having 6 to 18 carbon atoms and y is a number of from about 0.5 to about 5;

inverting said interpolymer in an aqueous liquid to viscosify the liquid;

admixing a hydrophobe-containing surfactant with said liquid after inversion of said interpolymer in an amount whereby the viscosity of the liquid is caused to further increase;

admixing an agent capable of forming a crosslink with the diol functional group to subsequently form a crosslinked aqueous gel; and injecting the crosslinked interpolymer mixture with or without a particulate agent into said formation in a manner that results in an increase in the production of fluids from said formation.

2. The method of claim 1 wherein said water soluble monomer is selected from the group comprising acrylamide, partially hydrolyzed acrylamide, N-substituted acrylamides, acrylic acid, methacrylic acid, and mixtures thereof and is present in an amount of at least about 94 mole percent to about 99 mole percent.

3. The method of claim 1 wherein said vicinal diol monomer is selected from the group comprising methacrylamidopropyldimethyl-2,3-dihydroxypropyl ammonium sulfate (MAPDMDHPAS), allyl glycidyl ether, glycidyl methacrylate, and glyceryl allyl ether and is present in an amount of about 0.5 mole percent to about 1 mole percent.

4. The method of claim 1 wherein said hydrophobe-containing surfactant has an HLB value of about 10 or less.

5. The method of claim 1 wherein said crosslinking agent is selected from the group of metal ion complexes that provide zirconium (IV) ions.

6. The method of claim 1 wherein said crosslinking agent is selected from the group of metal ion complexes that provide titanium (IV) ions.

7. The method of claim 5 wherein said metal ion is present in an amount in the range of about 0.004 to 0.020 percent by weight.

8. A method for treating a subterranean formation comprising:

providing an interpolymer that is the polymerization product of a mixture represented by the formula:

| water soluble (x) monomer | hydrophobe monomer (y) | vicinal diol (z) monomer |
|---|---|---| wherein said water soluble monomer is selected from the group comprising acrylamide and N-substituted acrylamides;

wherein said hydrophobe is selected from the group comprising alkyl methacrylate, acrylate esters, methacrylate esters, N-alkylacrylamide, and N-alkylmethacrylamides, said alkyl group having from 6 to 18 carbon atoms;

wherein said vicinal diol monomer is selected from the group comprising:

methacrylamidopropyldimethyl-2,3-dihydroxypropyl ammonium sulfate (MAPDMDHPAS), glyceryl allyl ether, glycidyl methacrylate, ally glycidyl ether; inverting said interpolymer in an aqueous liquid to viscosify the liquid;

admixing a hydrophobe-containing surfactant with said liquid after inversion of said interpolymer in an amount whereby the viscosity of the liquid is caused to further increase;

admixing an agent capable of forming a crosslink with the diol functional group to subsequently form a crosslinked aqueous gel; and injecting the crosslinked interpolymer mixture with or without a particulate agent into said formation in a manner that results in an increase in the production of fluids from said formation.

9. The method of claim 7 wherein said water soluble monomer is present in an amount of about 94 mole percent to about 99 mole percent.

10. The method of claim 9 wherein said hydrophobe monomer is present in an amount of about 0.5 mole percent to about 5 mole percent.

11. The method of claim 9 wherein said diol monomer is present in an amount of about 0.5 mole to about 1 mole percent.

12. The method of claim 9 wherein said hydrophobe-containing non-ionic surfactant has an HLB value of about 10 or less.

13. The method of claim 9 wherein said crosslinking agent is selected from the group comprising organometallic complexes of titanium and zirconium.

14. A method for treating subterranean formations comprising:

providing an interpolymer that is the polymerization product of a mixture represented by the formula:

| water soluble (x) monomer | hydrophobe monomer (y) | vicinal diol (z) monomer, |
|---|---|---| wherein said water soluble monomer is acrylamide, said hydrophobe monomer is an alkyl methacrylate said alkyl group having from 6 to 18 carbon atoms, and said diol monomer is methacrylamidopropyl-dimethyl-2,3-dihydroxypropyl ammonium sulfate;

inverting said interpolymer in an aqueous liquid to viscosify the liquid;

admixing a hydrophobe-containing surfactant having an HLB value of about 10 or less with said liquid after inversion of said interpolymer in an amount whereby the viscosity of the liquid is caused to further increase;

admixing an agent capable of forming a crosslink with diol functional group to subsequently form a crosslinked aqueous gel; and injecting the crosslinked interpolymer mixture with our without a particulate agent into said formation in a manner that results in an increase in production of fluids from said formation.

15. The method of claim 13 wherein said water soluble monomer is present in an amount of about 94 mole percent to about 99 mole percent, said hydrophobe monomer is present in an amount of about 0.5 to about 5 mole percent, said diol monomer is present in an amount of about 0.5 mole percent mole to about 1 mole percent.

16. The method of claim 15 wherein said hydrophobe-containing non-ionic surfactant is selected from the group comprising ethoxylated linear alcohols, ethoxylated alcohols, hydroxyalkylated fatty amides, ethoxylated phenols, and fatty amides.

17. The method of claim 15 wherein said crosslinking agent is selected from the group comprising triethanolamine titanate, titanium acetylacetonate, zirconium lactate, zirconium dimalate, triethamolamine zirconate, zirconium triethamolamine-polyol-water complex titanium triethamolamine-poly-water complex.

18. The method of claim 17 wherein the mole percent of x is about 94 to about 99; the mole percent of y is in the amount of about 0.5 to about 5; and the mole percent of z is about 0.5 to about 1.

* * * * *